(12) United States Patent
Swartzendruber et al.

(10) Patent No.: US 8,159,362 B2
(45) Date of Patent: Apr. 17, 2012

(54) METHOD OF DETECTING FAULTS USING GRADUATED FAULT DETECTION LEVELS

(75) Inventors: Ryan W. Swartzendruber, Prospect Heights, IL (US); Laurence Virgil Feight, Island Lake, IL (US); Tyson J. Salewske, Vernon Hills, IL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1622 days.

(21) Appl. No.: 11/518,334

(22) Filed: Sep. 8, 2006

(65) Prior Publication Data

US 2007/0086135 A1   Apr. 19, 2007

Related U.S. Application Data

(60) Provisional application No. 60/727,765, filed on Oct. 18, 2005.

(51) Int. Cl.
 *G08B 21/00* (2006.01)
 *H02H 3/00* (2006.01)

(52) U.S. Cl. .......................................... 340/648; 361/42

(58) Field of Classification Search ................. 340/648, 340/664; 361/93, 41, 42–50
 See application file for complete search history.

(56) References Cited

U.S. PATENT DOCUMENTS

| | | |
|---|---|---|
| 3,676,740 A | 7/1972 | Schweitzer |
| 3,702,966 A | 11/1972 | Schweitzer |
| 3,708,724 A | 1/1973 | Schweitzer |
| 3,715,742 A | 2/1973 | Schweitzer |
| 3,725,832 A | 4/1973 | Schweitzer |
| 3,781,682 A | 12/1973 | Schweitzer |
| 3,816,816 A | 6/1974 | Schweitzer |
| 3,866,197 A | 2/1975 | Schweitzer |
| 3,876,911 A | 4/1975 | Schweitzer |
| 3,906,477 A | 9/1975 | Schweitzer |
| 4,063,171 A | 12/1977 | Schweitzer |
| 4,152,643 A | 5/1979 | Schweitzer |
| 4,234,847 A | 11/1980 | Schweitzer |
| 4,247,879 A * | 1/1981 | Elms et al. ...................... 361/45 |
| 4,271,444 A * | 6/1981 | Howell ........................... 361/48 |
| 4,375,617 A | 3/1983 | Schweitzer |
| 4,438,403 A | 3/1984 | Schweitzer |
| 4,456,873 A | 6/1984 | Schweitzer |
| 4,458,198 A | 7/1984 | Schweitzer |
| 4,495,489 A | 1/1985 | Schweitzer |
| 4,631,625 A * | 12/1986 | Alexander et al. .............. 361/94 |
| 4,794,329 A | 12/1988 | Schweitzer |
| 4,794,331 A | 12/1988 | Schweitzer |
| 4,794,332 A | 12/1988 | Schweitzer |
| 4,795,982 A | 1/1989 | Schweitzer |
| 4,873,706 A | 10/1989 | Schweitzer |
| 4,904,932 A | 2/1990 | Schweitzer |
| 4,984,124 A | 1/1991 | Yeh |

(Continued)

*Primary Examiner* — Benjamin C Lee
*Assistant Examiner* — Sigmund Tang
(74) *Attorney, Agent, or Firm* — Eugene M. Cummings, P.C.

(57) ABSTRACT

A faulted circuit indicator utilizes digitized fault indication curves to determine if a fault has occurred in a monitored conductor. Fault indication curves are intended to be similar to trip curves of common power protection devices, and consist of a plurality of associated fault current levels and fault times. The faulted circuit indicator only displays a fault when the current within the monitored conductor exceeds one of the fault current levels for its associated fault time. This results in more accurate fault detection through the ability to distinguish between small and large amplitude faults coupled with the flexability of a fault indicator suitable for use on many different power systems.

15 Claims, 6 Drawing Sheets

U.S. PATENT DOCUMENTS

| | | | |
|---|---|---|---|
| 5,008,651 A | 4/1991 | Schweitzer | |
| 5,045,778 A | 9/1991 | Thibodeau et al. | |
| 5,070,301 A | 12/1991 | Schweitzer | |
| 5,077,520 A | 12/1991 | Schweitzer | |
| 5,095,265 A | 3/1992 | Schweitzer | |
| 5,153,565 A | 10/1992 | Schweitzer | |
| 5,168,414 A | 12/1992 | Horstmann | |
| 5,180,972 A | 1/1993 | Schweitzer | |
| 5,220,311 A | 6/1993 | Schweitzer | |
| 5,255,148 A * | 10/1993 | Yeh | 361/94 |
| 5,274,324 A | 12/1993 | Schweitzer | |
| 5,363,088 A | 11/1994 | Schweitzer | |
| 5,406,195 A | 4/1995 | Schweitzer | |
| 5,420,502 A | 5/1995 | Schweitzer | |
| 5,512,883 A * | 4/1996 | Lane, Jr. | 340/648 |
| 5,677,623 A | 10/1997 | Schweitzer | |
| 5,677,678 A | 10/1997 | Schweitzer | |
| 5,729,125 A | 3/1998 | Schweitzer | |
| 5,754,383 A | 5/1998 | Huppertz et al. | |
| 5,821,869 A | 10/1998 | Schweitzer | |
| 5,889,399 A | 3/1999 | Schweitzer | |
| 5,959,537 A | 9/1999 | Banting et al. | |
| 5,969,921 A * | 10/1999 | Wafer et al. | 361/45 |
| 5,990,674 A | 11/1999 | Schweitzer | |
| 6,014,301 A | 1/2000 | Schweitzer | |
| 6,016,105 A | 1/2000 | Schweitzer | |
| 6,043,433 A | 3/2000 | Schweitzer | |
| 6,133,723 A | 10/2000 | Feight | |
| 6,133,724 A | 10/2000 | Schweitzer | |
| 6,211,764 B1 | 4/2001 | Schweitzer | |
| 6,429,661 B1 | 8/2002 | Schweitzer | |
| 6,433,698 B1 | 8/2002 | Schweitzer | |
| 6,479,981 B2 | 11/2002 | Schweitzer | |
| 6,734,662 B1 | 5/2004 | Fenske | |
| 6,798,211 B1 | 9/2004 | Rockwell et al. | |
| 6,822,576 B1 | 11/2004 | Feight | |
| 6,894,478 B1 | 5/2005 | Fenske | |
| 6,949,921 B1 | 9/2005 | Feight | |
| 6,963,197 B1 | 11/2005 | Feight | |
| 7,023,691 B1 | 4/2006 | Feight | |
| 7,053,601 B1 | 5/2006 | Fenske | |
| 7,106,048 B1 | 9/2006 | Feight | |
| 7,570,465 B2 * | 8/2009 | Beatty et al. | 361/42 |

* cited by examiner

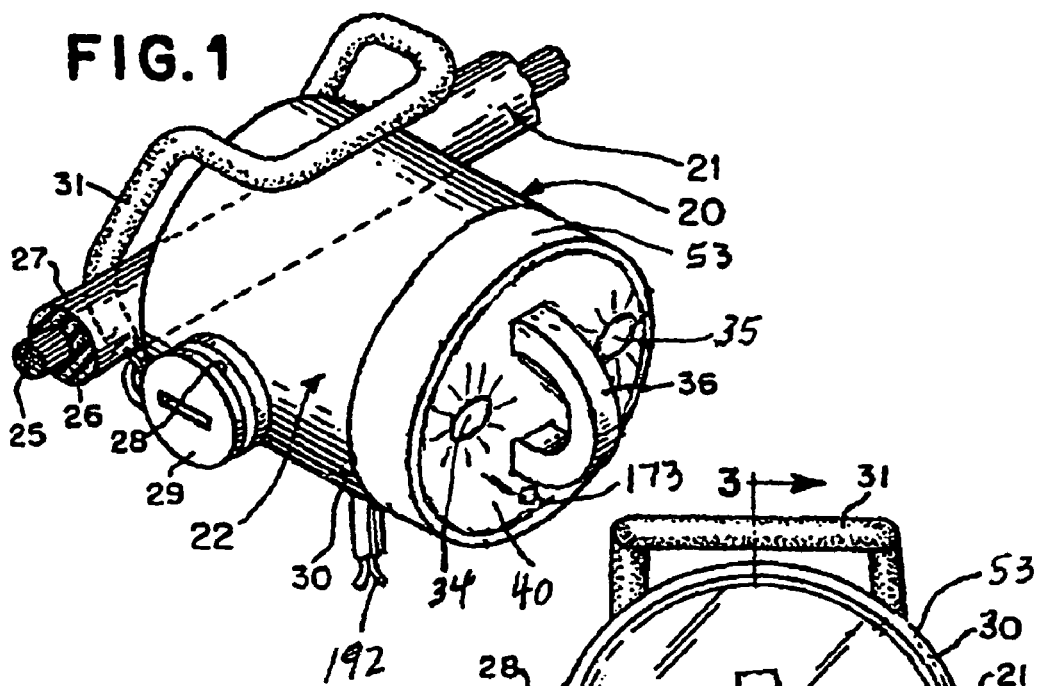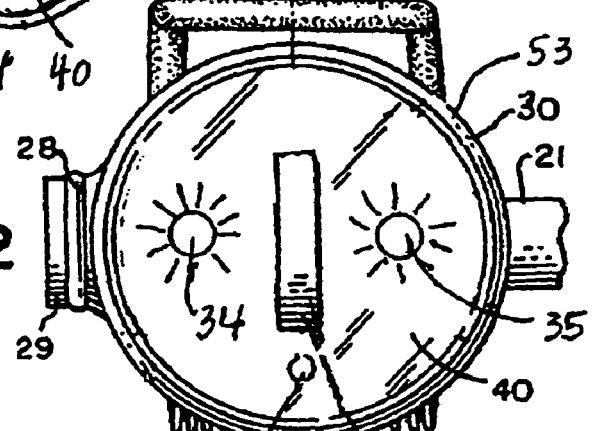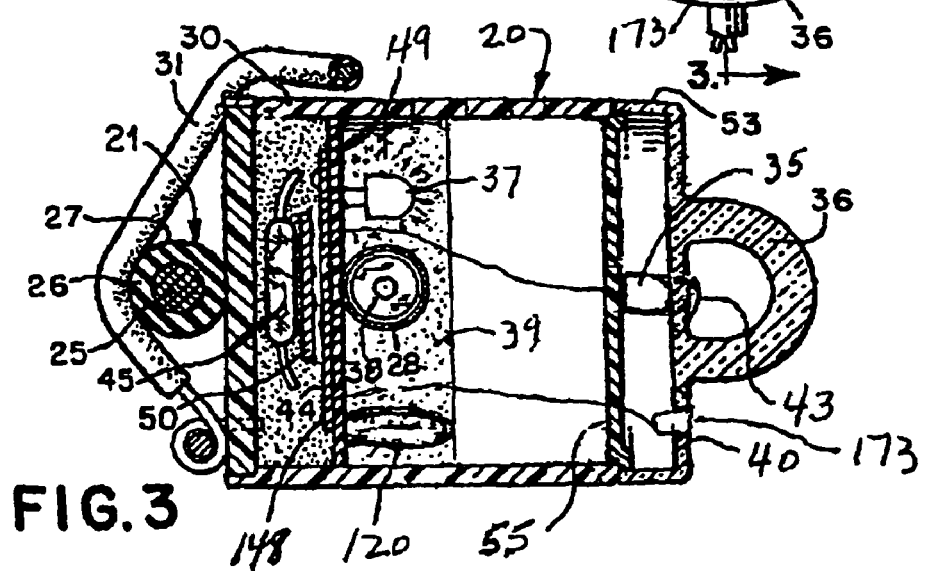

METHOD OF DETECTING FAULTS USING GRADUATED FAULT DETECTION LEVELS

CROSS-REFERENCE TO RELATED APPLICATIONS

This reference claims priority to provisional application 60/727,765, filed Oct. 18, 2005.

FIELD OF THE INVENTION

The present invention relates generally to apparatus, systems, and methods for sensing current in electrical power distribution systems, and more particularly to apparatus, systems, and methods for reliably indicating faults in electrical power distribution systems susceptible to current spikes of short duration during normal operation of the electrical power distribution system.

DESCRIPTION OF THE PRIOR ART

Various types of self-powered fault indicators have been constructed for detecting electrical faults in electrical power distribution systems, including clamp-on type fault indicators, which clamp directly over cables in the systems and derive their operating power from inductive and/or capacitive coupling to the monitored conductor; and test point type fault indicators, which are mounted on test points present on associated connectors of the systems and derive their operating power from capacitive coupling to the monitored conductor.

Electrical power distribution systems are susceptible to current spikes of short duration, which may be caused, for instance, by switching on large inductive loads. To avoid false display of fault conditions due to these normal current spikes, most faulted circuit indicators utilize a simple algorithm referred to in this document as Delayed Trip Time, which is a fixed delay time for which current in a monitored conductor must exceed a threshold before a fault is indicated. The use of Delayed Trip Time improves the operation of a faulted circuit indicator in response to normal current spikes. However, strict adherence to a delayed trip algorithm can cause a faulted circuit indicator to not indicate a fault when a very large fault current occurs for a brief period of time, and then dissipates. This situation can result from the occurrence of a fault sufficiently large to cause the system's protection devices to operate (i.e.; a fuse to open, etc.), which results in the monitored conductor's current falling to zero.

Prior art faulted circuit indicators have dealt with the problem of normal current spikes in a number of different ways. Some prior art fault indicators detect a fault by monitoring the rate of change of current in the monitored conductor over time, such as by using the current derivative, dI/dt. For example, the rate of change of current may have to exceed 100 amperes (A) within 50 milliseconds (ms). However, if a fault occurs with a rate of change in current of a lower magnitude, the fault may go undetected, and no fault indication will occur.

A different algorithm, described in U.S. Pat. No. 5,168,414, issued to Horstmann, takes a different approach to the problem of current spikes. A faulted circuit indicator using the Horstmann algorithm monitors current in a conductor and determines if it goes above a first predetermined level. A fixed time later, the faulted circuit indicator determines if the current in the monitored conductor has dropped below a second predetermined level, indicating that a protection device has operated; if so a fault is indicated. Other prior art algorithms use similar principles. However, any system that relies on the absence of current in an open conductor is susceptible to improper readings due to the presence of backfeed, or current flowing through a conductor that has been disconnected from the electrical power distribution system. Backfeed in a single phase of a three phase system may result from inductive coupling via other conductors, or for other reasons.

U.S. Pat. No. 4,984,124 attempts to mimic the trip curves of protection devices, such as fuses, through the use of an analog resistor-capacitor circuit. The circuit also has a large magnitude limit, above which any duration of fault current will be interepreted as a fault. A faulted circuit indicator using the disclosed circuit would potentially better detect faults involving current spikes. However, given the analog nature of the components used, the disclosed circuit has a fixed trip current threshold at the short duration asymptote of the time-current curve for its response. Additionally, such a circuit has a fixed lower asymptote on its trip current threshold on the long duration portion of the time current curve. This circuit can be configured to closely match specific fuse elements, however it is limited in application to a variety of fuse elements or system protection devices.

OBJECTS OF THE INVENTION

Accordingly, it is an object of this invention is to provide a fault indicator that utilizes digital fault indication curves similar to the trip curves of common power protection devices. Alternatively, curves could be constructed to span a number of common protection devices making them applicable to many systems.

Another object of this invention is to provide a fault indicator that automatically selects a fault indication curve based on the average level of current detected in the monitored conductor, thereby allowing one faulted circuit indicator to be used across a power distribution system Another object of this invention is to provide a fault detection algorithm which measures the magnitude and duration of fault current in discrete magnitude thresholds and individual pulses, which correspond to power system half cycles.

Yet another object of this invention is to provide the ability to adjust digital fault indication curves.

SUMMARY OF THE INVENTION

The present invention achieves its objectives through the use of one or more digital fault indication curves. In one embodiment of the invention, a faulted circuit indicator stores a collection of fault indication curves within a persistent memory component. Each fault indication curve comprises a plurality of associated fault current levels and fault times stored. In addition, the faulted circuit indicator comprises a current acquisition circuit adapted to monitor current within a conductor, and a Digital to Analog Converter (DAC) coupled to an analog comparator circuit. The current acquisition circuit is also coupled to the comparator, which outputs a digital signal indicating the detection of instantaneous fault current in a form usable by a processor. The processor, which is stored within the same housing as the rest of the components, controls the DAC output, and determines if the current within the conductor is outside the range allowed by the presently selected fault indication curve by monitoring the output of the analog comparator; i.e.; whether the current exceeds one of the fault current levels for its associated fault time. If so, the faulted circuit indicator displays a fault condition.

In a further refinement of this embodiment, the persistent memory component contains a plurality of fault indication curves, and the processor selects an appropriate fault indication curve based on the average current level within the monitored conductor. The average current level may be determined by a dedicated analog circuit, or by the processor maintaining an average within its memory.

The disclosed invention may also be implemented as a method for determining whether a fault has occurred within a monitored conductor. In this embodiment, a processor receives the level of current within a monitored conductor from an analog to digital converter. The received current is compared to a fault indication curve, and if the received current exceeds any of the fault current levels for their associated fault times, a fault signal is registered and output.

In a further refinement of this embodiment, the processor determines the average current within the monitored conductor and selects an appropriate fault indication curve based on the average current level within the monitored conductor.

BRIEF DESCRIPTION OF THE DRAWINGS

Although the characteristic features of this invention will be particularly pointed out in the claims, the invention itself, and the manner in which it can be made and used, can be better understood by referring to the following description taken in connection with the accompanying drawings forming a part hereof, wherein like reference numerals refer to like parts throughout the several views and in which:

FIG. 1 is a perspective view of an electric field powered clamp-on fault indicator with provision for external battery replacement that is constructed in accordance with the present invention and that may be installed on a cable within a power distribution system.

FIG. 2 is a front view of the fault indicator of FIG. 1 showing illuminated LEDs to indicate the occurrence of a fault.

FIG. 3 is a cross-sectional view of the fault indicator of FIGS. 1 and 2 taken along the sectional line 3-3 of FIG. 2.

DETAILED DESCRIPTION OF THE ILLUSTRATED EMBODIMENTS

Figure 4:
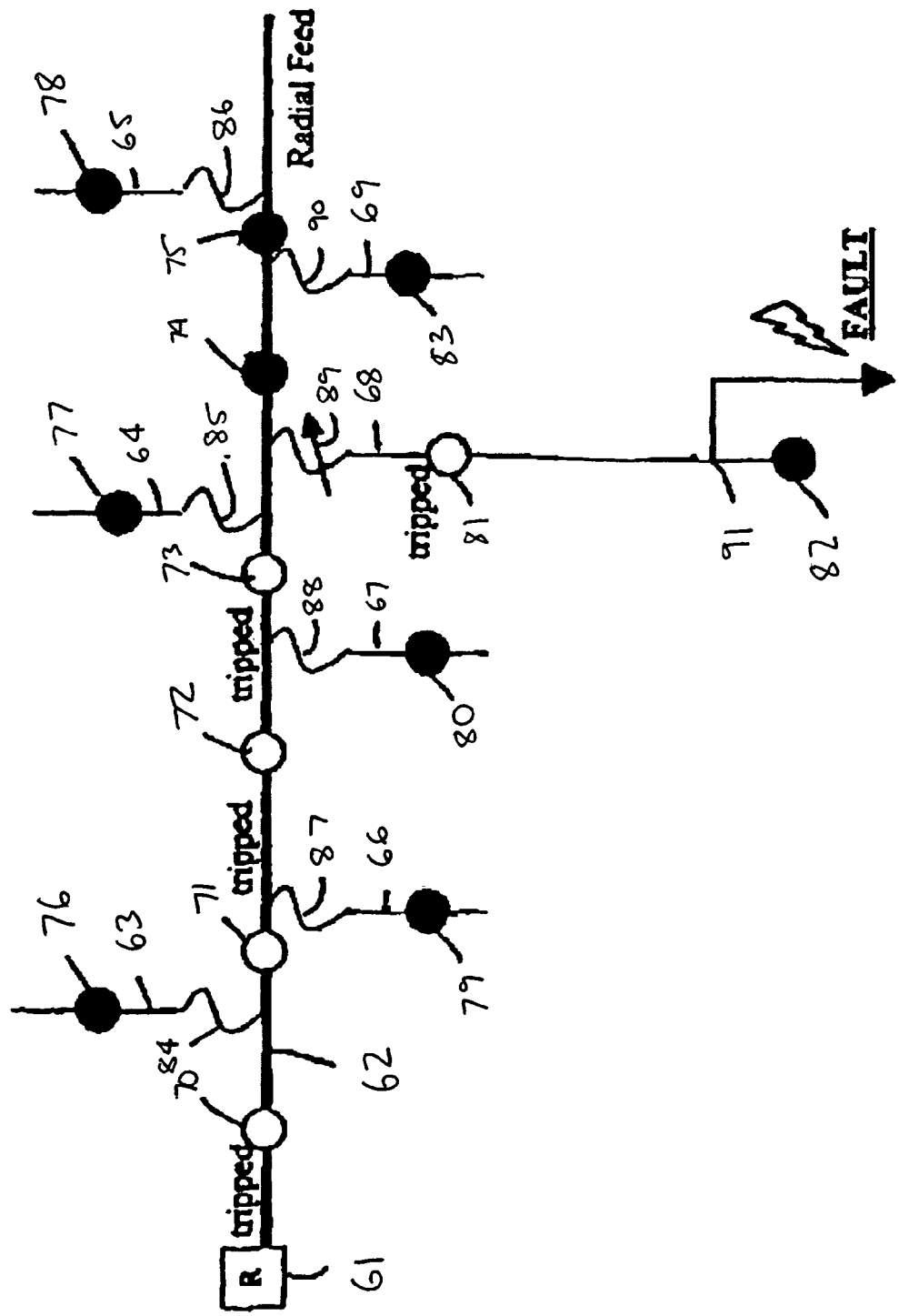
FIG. 4 is a diagrammatic illustration of an electrical distribution system employing a plurality of fault indicators to assist in locating a fault on the system.

Referring to the Figures, and particularly to FIG. 1, a faulted circuit indicator, generally designated 20, is constructed in accordance with the invention. Fault indicator 20 indicates fault currents in an electrical feeder or distribution cable, generally designated 21, and includes a circuit module, generally designated 22. In accordance with conventional practice, circuit module 22 is attached to the outer surface of the cable 21, which may include a central conductor 25, a concentric insulating layer 26 and an electrically grounded rubber outer sheath 27.

Circuit module 22 includes a housing 30 (FIG. 2) that contains electronic circuitry for sensing and responding to fault currents in cable 21. A clamp assembly 31 attaches the module to a monitored conductor, such as cable 21. The structure and operation of this circuitry is discussed below. An eye 36 on an end cap 53 may be provided to allow use of a conventional hot stick during installation or removal of fault indicator 20 about cable 21. When installed on an overhead cable, fault indicator 21 normally hangs downwardly such that a face 40 containing the status indicators 34 and 35 is easily viewed from the ground by service personnel or the like.

Housing 30 and end cap 53 may be formed from any suitable material, such as plastic. End cap 53 forms part of the housing 30, and may be sonically welded to housing 30 to seal the interior of fault indicator 20 against contamination. A battery holder 28 within housing 30 includes a removable end cap 29, which provides access to a cylindrical battery compartment within which a battery 38 (FIG. 3) is contained. In this example, battery 38 may be one or more type AA lithium thionyl chloride cells that have about 2.4 ampere-hours of capacity and that are commercially available.

Circuit module 22 also includes status indicators in the form a pair of LEDs 34 and 35 to indicate whether a fault has occurred on cable 21. In operation, during normal current flow through conductor 21, LEDs 34 and 35 are normally off and not illuminated. Upon occurrence of a fault in a monitored conductor, LEDs 34 and 35 are illuminated by electronic circuitry, which is discussed in further detail below. For best viewing from different angles of view, LEDs 34 and 35 are at least flush with the exterior surface of end cap 53, and may project slightly above the top surface 40 of the end cap, or end cap 53 may be provided with convex lenses 43 to provide illumination in about a 180 degree field of view for better viewing by service personnel. LEDs 34 and 35 may be selected from any color commercially available. However, a color commonly associated with a fault, such as red, is preferred.

A light sensor 173 may be disposed on the face 40 of fault indicator 20 to sense ambient light levels. As further discussed below, light sensor 173 may influence the intensity of light provided by LEDs 34 and 35 under differing ambient light conditions.

A pigtail 192 may provide signals relating to the operational status of fault indicator 20, such as to a remote location, for remotely monitoring an electrical distribution system or for automation purposes.

With reference to FIG. 3, a partition 55 may be integral to housing 30 for supporting the status indicator LEDs 34 and 35 and for better sealing of the interior of fault indicator 20. End cap 53 is preferably of a contrasting color to LEDs 34 and 35, such as dark blue, for better visibility of the LEDs. A third LED 37 is disposed internally in housing 30, such as in the potting compound 39 that encases most of the electronic circuitry. Third LED 37 becomes illuminated during a fault condition when the light sensor 44 also senses a low ambient lighting level, such as at nighttime. The objective is to make housing 30 glow in the dark after a sensed fault condition for better visibility. To this end, potting compound 39 is preferably clear and housing 30 is preferably formed from translucent plastic. Of course, other combinations of materials may be selected to achieve similar results, such as translucent potting compound 39 with a clear or translucent housing 30. When third LED 37 is illuminated after sensing a fault condition at reduced ambient light levels, LEDs 34 and 35 are also preferably illuminated to indicate the fault condition at the face 40 of fault indicator 20.

In order to better understand some of the aspects of the present invention, the application of faulted circuit indicator 20 in an electrical distribution system will now be considered. Turning now to FIG. 4, a portion of an electrical distribution system, generally designated 60, is controlled by a reclosing relay 61. Electrical distribution system 60 may be of the radial feed type including a main line 62 and a plurality of radial lines 63-69. Main line 62 is typically a higher voltage overhead line. Radial lines 63-69 are typically lower voltage underground lines used in residential applications. For example, lines 63-69 often surface from their underground location at transformers in pad mounted enclosures. A plurality of fault indicators 70-82 is employed on the main and radial lines to assist in any fault that may occur on the system 60. If fault indicators are located on the main line between each radial feed line and on each radial feed line, the fault can be located by following the tripped or fault-indicating indicators 70-82.

In the example of FIG. 4, the tripped fault indicators 70-73 and 81 are shown with white centers. The untripped or reset fault indicators are shown with black centers. The system 60 also employs a plurality of fuses 84-90; one for each of the radial lines 63-69. In this example, a fault at a point 91, such as to ground, in line 68 is easily isolated by a lineman following the tripped fault indicators 70-73 and 81 as being between tripped fault indicator 81 and untripped fault indicator 82. Note that the fault at point 91 has also caused fuse 89 to blow or open.

Reclosing relays, such as relay 61, attempt to restore power to the distribution system 60 after a predetermined time, such as 200-350 milliseconds (ms). Relay 61 may close for about 200-350 ms, and if the fault persists, relay 61 will again reopen for another 200-350 ms. If the fault remains after about three reclosing attempts, the relay 61 will remain in an open or locked out condition. In the example of FIG. 4, the relay 61 is likely to succeed in the first reclosing attempt because the blown fuse 89 now electrically isolates line 68, including the fault at point 91, from the remainder of the distribution system 60.

However, if fault indicators 70-73 are of the type that automatically reset upon the restoration of line current, fault indicators 70-73 will be reset before a lineman can view these fault indicators. Thus, fault indicators 70-73 will not assist in quickly isolating the fault on the system 60. Instead, the lineman will have to try to find tripped fault indicator 81 and/or blown fuse 89.

Fault indicator 20 has a timed reset to reset some hours after a fault occurs. Thus, in the example of FIG. 4, fault indicators 70-73 continue to display the fault by periodically illuminating LEDs 34 and 35, and LED 37 at nighttime if implemented, after reclosing relay 61 restores current to main line 62. This enables a lineman to easily trace the fault by following fault indicators 70 through 73 and 81 to a section of the line between fault indicators 81 and 82. The point of the fault 91 may then be located and repaired, or line 68 may be replaced. As will be understood hereinafter, the length of the timed reset may be in the range of 1 to 24 or more hours, and is preferably about 4 hours. Four hours normally provides sufficient time for a lineman or repair crew to review the tripped fault indicators to determine the part of the distribution system that has caused the fault.

Rather than waiting for the predetermined reset time to elapse, fault indicator 20 may be manually reset at any time. To this end, a reset magnetic reed switch 120 is disposed in the housing 30 of FIG. 3, preferably at a generally perpendicular angle to conductor 21. Magnetic reed switch 120 may be manually closed with a permanent magnet tool in a manner known to the art.

Figure 5:
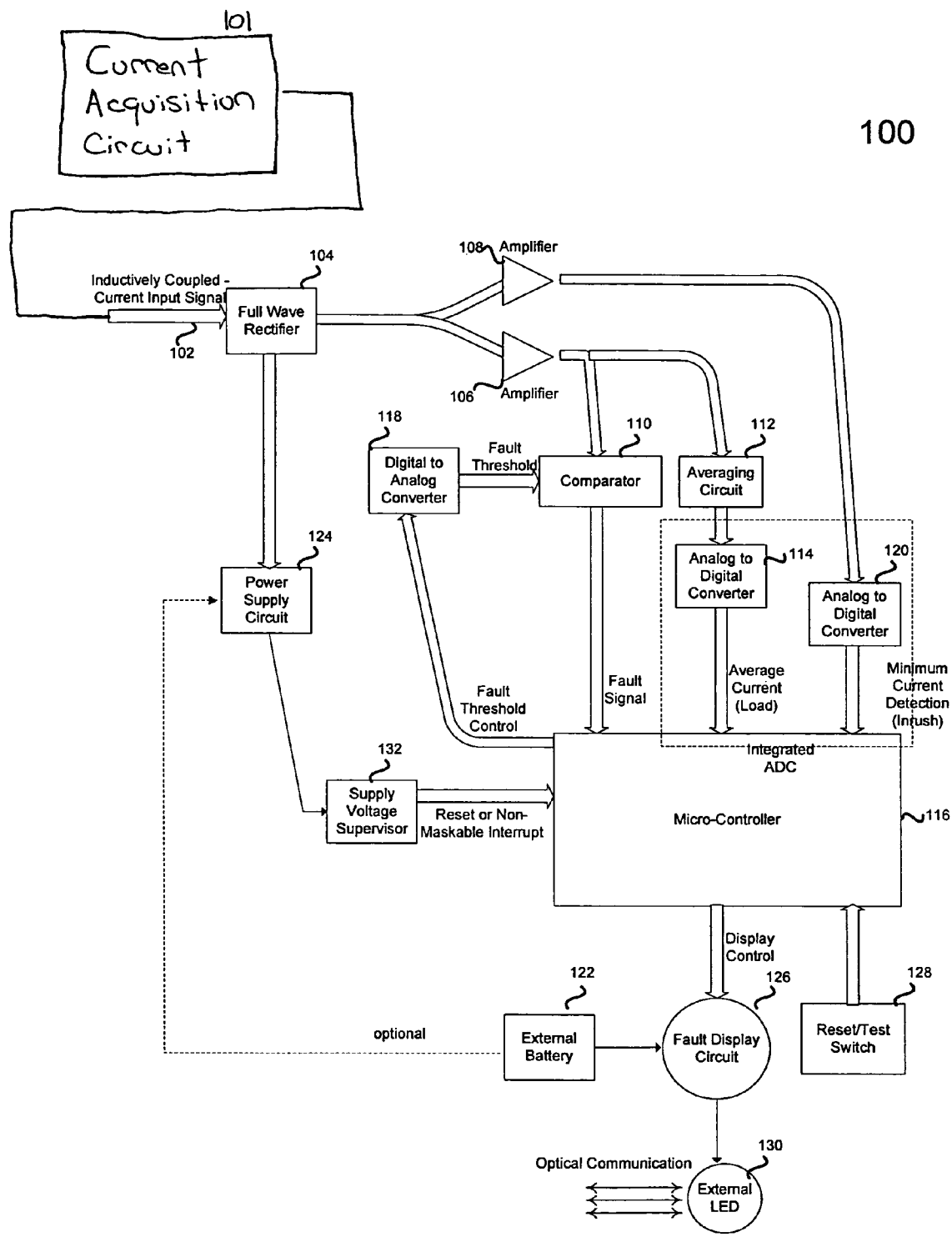
FIG. 5 is a block diagram view of the operative circuitry of an embodiment of the disclosed faulted circuit indicator.

FIG. 5 illustrates the electronic circuitry, generally designated 100, for the disclosed fault indicator in block diagram form. A current acquisition circuit 101, which may include a current transformer, senses current in a monitored conductor. The Acquired/Monitored Current 102 passes through a full wave rectifier 104, and into a pair of amplifiers 106 and 108. The output of amplifier 106 is routed to Comparator 110, which generates a fault signal in the manner described below. The output of amplifier 106 is also routed through an averaging circuit 112, and then into an Analog to Digital Converter (ADC) 114 which may be an inherent accessory of the Processor 116. Alternatively, averaging circuit 112 may not be present, and the Processor 116 will then determine the instantaneous and average current using algorithms well known in the art. Based on the measured average current, the Processor 116 will program a Digital to Analog Converter (DAC) 118 to generate an input signal to the Comparator 110.

The output from the amplifier 106 is tied to the negative input terminal of the Comparator 110. The positive input terminal of the Comparator 110 is sourced by the DAC 118 programmed by the Processor 116. In this way, the Processor 116 can control the Comparator 110 threshold. Adjusting the Comparator 110 threshold directly controls the fault current threshold.

The output of amplifier 108 is shown being passed through a second ADC 120. Note that a single ADC and a multiposition analog switch could be used as well. The Processor 116 uses the data from this second ADC 120 to monitor the peak current detected by the current acquisition circuit once every half cycle period. If the monitored peak current is not sufficiently large, the Processor 116 will record the time. The particular magnitude which the current must fall below before System Detect state is triggered is determined by the value of the monitored average current.

FIG. 5 also shows an optional external battery 122, which may provide backup power to the Power Supply Circuit 124, Processor 116, Display Control 126, or some subset thereof. The Power Supply Circuit 124, which consists of one or more DC regulators and required support circuitry, provides regulated power to all circuits in the fault indicator. It receives unregulated power from either the External Battery 122 or the Full Wave Rectifier 104.

Circuitry for a number of other functions common to faulted circuit indicators is also shown in FIG. 5. FIG. 5 shows a Display Controller 126. The actual display could be, for example, LEDs or a mechanical rotor display. The Processor 116 controls the Display Controller 126. FIG. 5 also shows a Reset/Test Switch 128. The Reset/Test Switch 128 allows maintenance personnel to manually reset the fault indicator and clear any faults, or, if no faults have been noted, to test the operation of the fault indicator and ensure that it can properly display the occurrence of any faults. In addition, FIG. 5 shows an External LED 130 coupled to the External Battery 122. This External LED 130 is a means to display the detected fault condition. Additionally the LED may be configured to optically communicate with a computer or other device monitoring the fault indicator. Such communications could take place over fiber-optic lines.

In response to various circuit conditions, the Processor 116 can activate the Display Control 126 to indicate that a fault has occurred. It can optionally provide a SCADA output signal (not shown). If the fault indicator is of the targeted type the Processor 116 can set the target to the fault indicating condition, or it can reset the target to the normal condition after a timed reset interval, or the occurrence of some other condition, such as the monitored current falling below a predetermined or calculated value for a period of time. Processor 116 may optionally display information on a seven-segment display, such as the amount of elapsed time since a fault occurred. The Processor 116 may also be optionally provided with a radio frequency (RF) link to report status information to a data or communication system at a remote location, such as a system for monitoring the electrical distribution system that employs a plurality of fault indicators.

It is desirable for a faulted circuit indicator to avoid falsely interpreting noise, arcing, transients, or the like, on the monitored conductor as a fault. To this end, an embodiment of the disclosed faulted circuit indicator uses a delayed trip response time. The use of a delayed trip response time is well-known in the prior art. Delayed trip response time refers to the duration of time which the fault current must be sustained before it is treated as a fault. Unlike the prior art, however, the disclosed invention does not use a fixed time period for the delayed trip response time. Instead, the delayed trip time is determined by the Processor 116 based on the measured average current. This feature is termed Dynamic Delayed Trip ("DDT") by the inventor. The use of DDT involves measuring the average current in the monitored conductor and determining the delayed trip response time based on the average measured current. This determination could be the result of a formulaic calculation, or, alternatively, it could be the result of comparing the average measured current to a collection of values specifying the upper and lower bounds of acceptable current for a given delayed trip time.

The use of a delayed trip response time allows for certain very high magnitude faults to not be detected because the fuse protecting the monitored conductor will blow before the delayed trip response time elapses. To properly catch faults in this circumstance, this invention determines if a fault lasts for longer than one-half the automatically configured delayed trip response time. If such a fault occurs, and the subsequent detected current is less than the inrush level than the fault indicator of this invention assumes that a fault occurred which blew the fuse protecting the monitored conductor, and records the event as a fault.

The disclosed fault indicator also incorporates the ability to detect the system frequency. In one example, the fault indicator can detect the system frequency as either 50 Hz or 60 Hz. All timing parameters are recorded in terms of cycles, half-cycles, quarter-cycles, etc. This allows utilities worldwide to understand the timing of the disclosed fault indicator without having to mathematically correlate the device timing to their system frequency. Thus, the disclosed fault indicator can be moved from a 60 Hz powerline to a similar capacity 50 Hz powerline with no changes in performance or user configuration.

As discussed above, an embodiment of the disclosed fault indicator optionally has an LED connection. The LED can be connected via wire and mounted external to the main circuitry. Alternatively, the LED can be mounted directly with the other circuitry. Optical fiber could then be used to direct the LED output to a remote location.

As previously described, a magnetic reed switch may be used to reset the fault indicator. The reed switch can be also used to activate the fault display, thereby performing a test of the device functionality.

Processor 116 is normally in a standby or sleep mode in which it draws virtually no power from External Battery 122. For example, Processor 116 may typically draw 7 microamperes, or less, from External Battery 122 when it is in the sleep mode and about 200 microamperes when it is in the active mode. Such processors are commercially available. Sleep states or modes are sometimes also referred to as a power down mode. Processor 116 may, in general, be any microcontroller, microprocessor or programmable controller that has a low current drain, especially in the sleep mode.

Another feature of the disclosed faulted circuit indicator is its use of fault indication curves that closely match the trip curves of common power protection devices, such as fuses. This feature requires the microprocessor to store at least one fault indication curve within persistent memory component, where the fault indication curve comprises some number of successive trip current levels, as well as a time associated with each trip current. The microprocessor will then base its trip decision on whether the monitored current has exceeded any of the successive trip current levels for the associated period of time. Fault indication curves can be designed to closely match the trip curve of common power protection devices.

Figure 6:
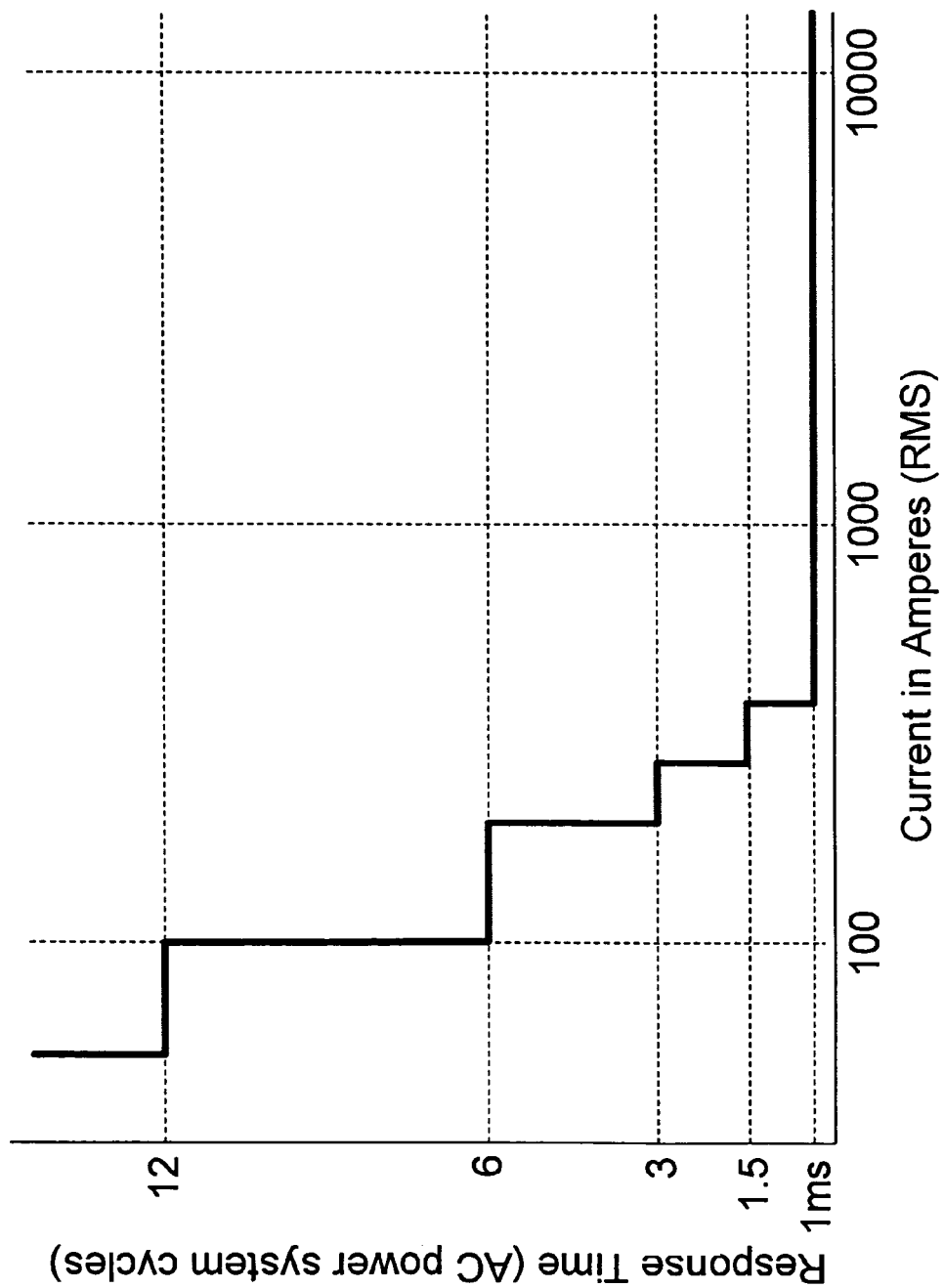
FIG. 6 is a plot of the relationship between the response time of the FCI in power system cycles and the detected fault current of the conductor for a given monitored average current.

One such fault indication curve is illustrated in FIG. 6. The illustrated fault indication curve shows eight discrete combinations of trip current and time, although any number of combinations could be used. As is readily apparent, the time allowed before a fault is registered decreases rapidly as the trip current rises before plateauing at the minimum detection time for the faulted circuit indicator.

Figure 7A:
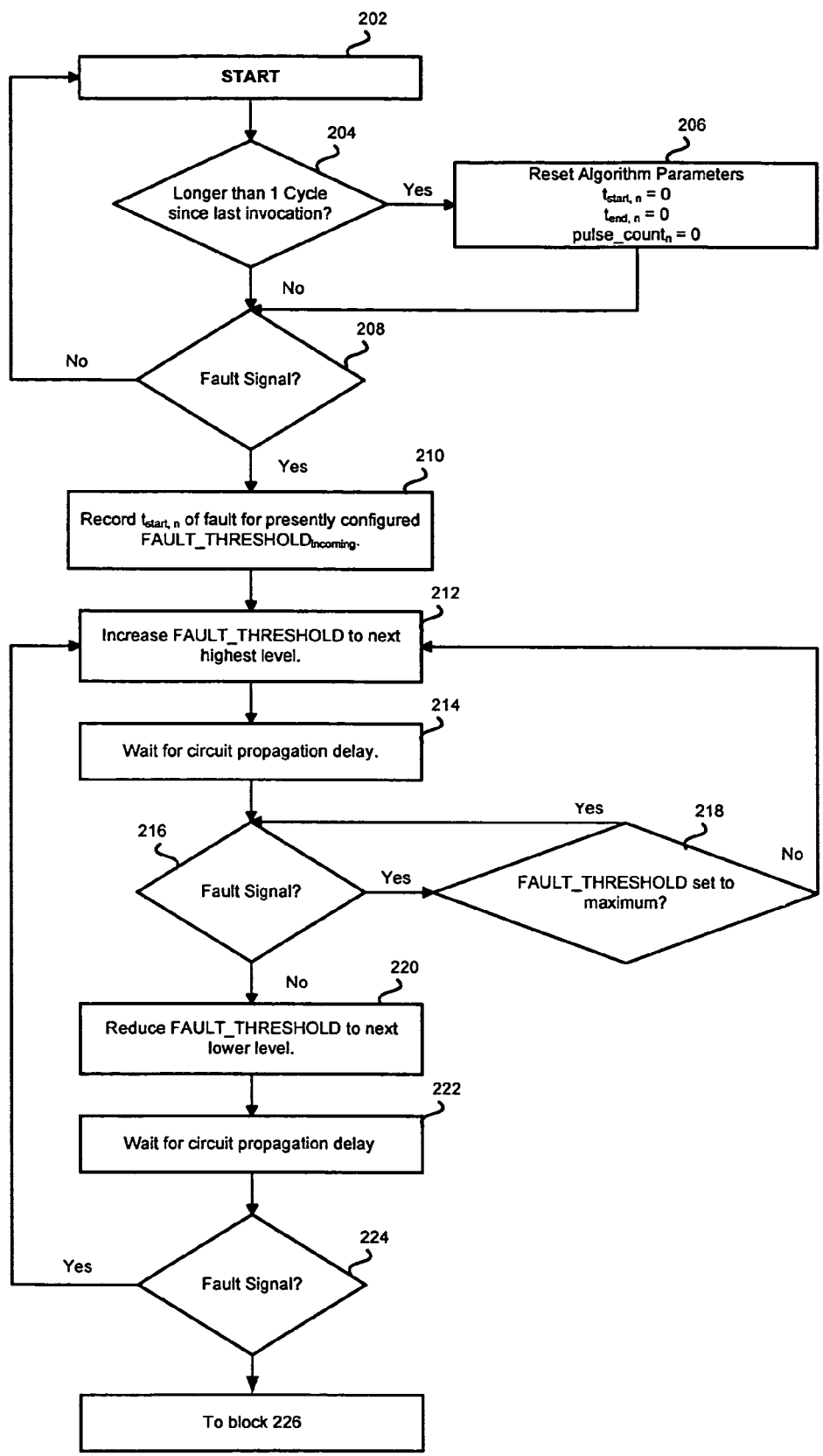
FIG. 7A is a flow chart illustrating an embodiment of the disclosed fault detection algorithm.
Figure 7B:
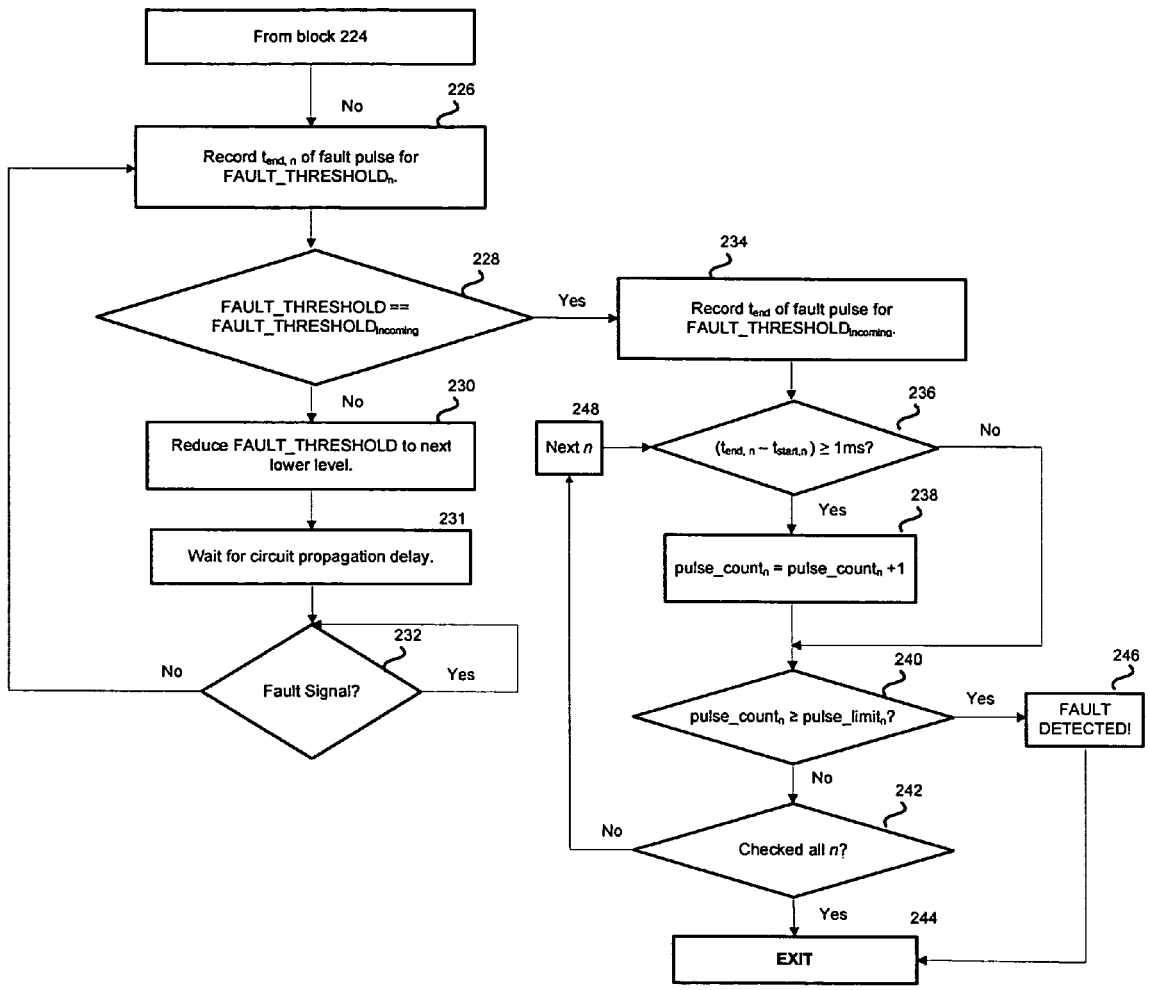
FIG. 7B is a continuation of the flow chart started in FIG. 6A.

A flow chart of a preferred embodiment of the algorithm used to detect faults using fault indication curves is illustrated in FIG. 7A and FIG. 7B. This algorithm is executed by the Microcontroller 116 of FIG. 5. As shown, the microcontroller 116 begins in an initialization or START block 202. In step 204, the microcontroller 116 determines if more than one cycle has elapsed since the last invocation of the algorithm; if so, several parameters are reset as shown in step 206. Next, the microcontroller 116 determines if a potential fault has occurred in step 208. This corresponds to whether the monitored current has exceeded the present fault current level. If no fault is recorded, the microcontroller returns to step 202.

If a fault is registered, the microcontroller proceeds to step 210 where the present fault current level and the present time is recorded. In step 212, the present fault current level (FAULT_THRESHOLD) is increased to the next highest level; therefore, if the present fault current level was 50 A, it would be increased to 100 A, assuming the fault indication curve of FIG. 6 was used. If any analog levels need to be reset, as would be required of the circuit shown in FIG. 5, the microcontroller will wait for the amount of time necessary for the circuit to make accurate measurements in step 214. The microcontroller then checks to see if the present fault current level has been exceeded in step 216. If so, the microcontroller determines if the present fault current level has been set to its maximum for the selected fault indication curve in step 218. If so, the microcontroller will continue checking to see if the maximum fault current level is exceeded by executing step 216. Otherwise, the microcontroller will return to step 212, where the present fault current level will be increased by one step.

If no fault is detected in step 216, the microcontroller will proceed to step 220, where the present fault current level will be reduced by one step. If any analog levels need to be reset, as would be required of the circuit shown in FIG. 5, the microcontroller will wait for the amount of time necessary for the circuit to make accurate measurements in step 222. The microcontroller then proceeds to step 224, where it again checks to see if the present fault current level has been exceeded. If the fault current level has been exceeded, the microcontroller proceeds to step 212.

If the fault current level measured at step 224 is not exceeded, the microcontroller proceeds to step 226, where the end time for the present fault current level is recorded. In step 228, the microcontroller determines if the present fault current level is equal to the fault current level first selected in step 210. If not, the fault current level is reduced in step 230. As before, when the present fault current level is changed, the microcontroller may have to wait for some period of time before making any further readings, and will do so if necessary in step 231. The microcontroller then determines if the current in the monitored conductor exceeds the present fault current level in step 232. If so, the microcontroller remains in step 232. If not, the microcontroller returns to step 226.

Eventually, the microcontroller will arrive at step 228, and the present fault current level will be the fault current level recorded in step 210. When that occurs, the microcontroller will continue to step 234, where it will record the end time of the fault associated with that fault current level. In steps 236-248, the microcontroller then checks the times of all recorded fault pulses to determine if a fault should be triggered. It does this by subtracting the start time from the end time for each recorded fault current level and checking that against the fault time required for the given fault level in the selected fault indication curve. If a fault is detected, it is registered in step 246, and the display of the faulted circuit indicator is activated. Otherwise, the microcontroller will proceed to an exit step in 244, where any required initialization is performed, prior to returning to the start step in 202.

A further refinement of this invention can be achieved by allowing operators additional control over the fault indication curves used by the disclosed faulted circuit indicator. An operator could be allowed to select a particular body of fault indication curves which matches the protection devices deployed throughout the operator's system. In addition, the operator could program different curves into the unit, or even configure the unit for a fixed fault level. One way to allow the operator this added flexibility would be through the use of the LED 130 of FIG. 5 acting as a reprogramming port, where commands issued through the LED 130 direct the processor 126 to reprogram stored fault indication curves.

Note that the invention described herein utilizes a digital processor. As the algorithms described do not require any particular processing characteristics, any type of processor will suffice. For instance, microprocessors, microcontrollers, digital signal processors, field programmable gate arrays, application specific integrated circuits (ASIC) and other devices capable of digital computations are acceptable where the term processor is used.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A faulted circuit indicator comprising:
   i) a housing;
   ii) a current acquisition circuit disposed within the housing, the current acquisition circuit adapted to monitor current within a conductor;
   iii) an adjustable trip circuit coupled to the current acquisition circuit and producing a trip output when the monitored current exceeds a trip level;
   iv) a persistent memory component disposed within the housing, the persistent memory component storing a fault indication curve comprising a plurality of associated fault current levels and fault times, wherein each fault current level is a current level which when exceeded by the monitored current for the duration of the associated fault time, indicates a current fault; and
   v) a processor disposed within the housing and coupled to the adjustable trip circuit and the persistent memory component, the processor adjusting a the trip level of the adjustable trip circuit after a time period has elapsed and based on the fault indication curve and producing a fault signal based on the trip output and the fault indication curve.

2. The faulted circuit indicator of claim 1, wherein the persistent memory component is contained within the processor.

3. The faulted circuit indicator of claim 1, wherein the processor also determines an average current level within the conductor, and selects an appropriate fault indication curve based on the average current level.

4. The faulted circuit indicator of claim 1, further comprising an averaging circuit disposed within the housing and coupled to the current acquisition circuit and the processor, and wherein the averaging circuit produces an output proportional to the average current level within the conductor, and wherein the processor selects an appropriate fault indication curve based on the output of the averaging circuit.

5. The faulted circuit indicator of claim 1, further comprising a display disposed within the housing and coupled to the processor, and wherein the processor activates the display if a fault has occurred.

6. The faulted circuit indicator of claim 1, wherein the associated fault time is a multiple of power system cycles.

7. The faulted circuit indicator of claim 1, wherein the adjustable trip circuit comprises a digital to analog converter and a comparator.

8. The faulted circuit indicator of claim 1, wherein the adjustable trip circuit is implemented as executable instructions within the processor.

9. A method operating within a processor for determining whether a fault has occurred within a monitored conductor, the method comprising the steps of:
   i) receiving a level of current within the monitored conductor, resulting in received current;
   ii) comparing the received current to a fault indication curve, wherein the fault indication curve comprises a plurality of associated fault current levels and fault times; and
   iii) outputting a fault signal if the received current exceeds any particular fault current level of the fault indication curve for the duration of the fault time associated with the particular fault current level.

10. The method of claim 9, further comprising the steps of:
    i) calculating an average current level within a monitored conductor for a predetermined period of time from the received current; and
    ii) selecting an appropriate fault indication curve based on the average current level.

11. The method of claim 9, wherein the fault time associated with the particular fault current level is a multiple of a power system frequency.

12. The faulted circuit indicator of claim 1, further comprising a display in communication with the housing, and wherein the processor activates the display if a fault has occurred.

13. The faulted circuit indicator of claim 12, wherein the display is remote from the housing.

14. The faulted circuit indicator of claim 1, wherein the processor adjusts the trip level to of the adjustable trip circuit such that the trip level comprises a fault time shorter than a previous fault time for a fault current level that is higher than a previous fault current level.

15. The faulted circuit indicator of claim 1, wherein the time period is a predetermined time period.

* * * * *